US008001539B2

(12) United States Patent
Mitchell

(10) Patent No.: US 8,001,539 B2
(45) Date of Patent: Aug. 16, 2011

(54) HISTORICAL DATA MANAGEMENT

(75) Inventor: Kevin Mitchell, Edinburgh (GB)

(73) Assignee: JDS Uniphase Corporation, Milpitas, CA (US)

( * ) Notice: Subject to any disclaimer, the term of this patent is extended or adjusted under 35 U.S.C. 154(b) by 1205 days.

(21) Appl. No.: 11/712,065

(22) Filed: Feb. 28, 2007

(65) Prior Publication Data

US 2008/0208888 A1   Aug. 28, 2008

(51) Int. Cl.
G06F 9/44 (2006.01)
G06F 9/45 (2006.01)
(52) U.S. Cl. ......... 717/158; 717/130; 717/151; 717/168
(58) Field of Classification Search .................. None
See application file for complete search history.

(56) References Cited

U.S. PATENT DOCUMENTS

| | | | |
|---|---|---|---|
| 7,496,908 B2* | 2/2009 | DeWitt et al. ................. | 717/158 |
| 2004/0025115 A1* | 2/2004 | Sienel et al. .................. | 715/513 |
| 2005/0155020 A1* | 7/2005 | DeWitt et al. ................. | 717/130 |
| 2006/0236314 A1* | 10/2006 | Blagojevic et al. ........... | 717/168 |
| 2007/0006152 A1* | 1/2007 | Ahmed et al. ................. | 717/122 |
| 2007/0169045 A1* | 7/2007 | Nallipogu et al. ............ | 717/151 |
| 2007/0180439 A1* | 8/2007 | Sundararajan et al. ....... | 717/158 |
| 2010/0166185 A1* | 7/2010 | Shukla et al. ................. | 380/277 |

OTHER PUBLICATIONS

"XML tag information management system: a workbench for ontology-based knowledge acquisition and integration", Mima et al., Mar. 2002, pp. 286-291, <http://delivery.acm.org/10.1145/1290000/1289213/p286-mima.pdf>.*
"Enhanced topic distillation using text, markup tags, and hyperlinks", Chakrabarti et al., Sep. 2001, pp. 208-216, <http://delivery.acm.org/10.1145/390000/383990/p208-chakrabarti.pdf>.*

* cited by examiner

*Primary Examiner* — Thuy Dao
(74) *Attorney, Agent, or Firm* — Matthew A. Pequignot; Pequignot + Myers LLC

(57) ABSTRACT

An apparatus and method for managing historical data includes receiving a compiled application program and a declarative specification. An enhancer generates one or more representations of at least one data class defined in the application program based on at least one historical metatag and historical metadata associated therewith from the declarative specification. The enhancer also generates configuring instructions for configuring a database in accordance with the storage representation(s), an enhanced compiled application program including instructions for accessing data in the configured database, and a historical updater program for updating the data in the database based on the historical metadata. Once the database is configured in accordance with the configuring instructions and data is stored in accordance with the storage representation(s), the enhanced compiled application program is executed to access the database so as to retrieve historical data therefrom and the historical updater program is executed to update the data in the database based on the historical metadata.

20 Claims, 1 Drawing Sheet

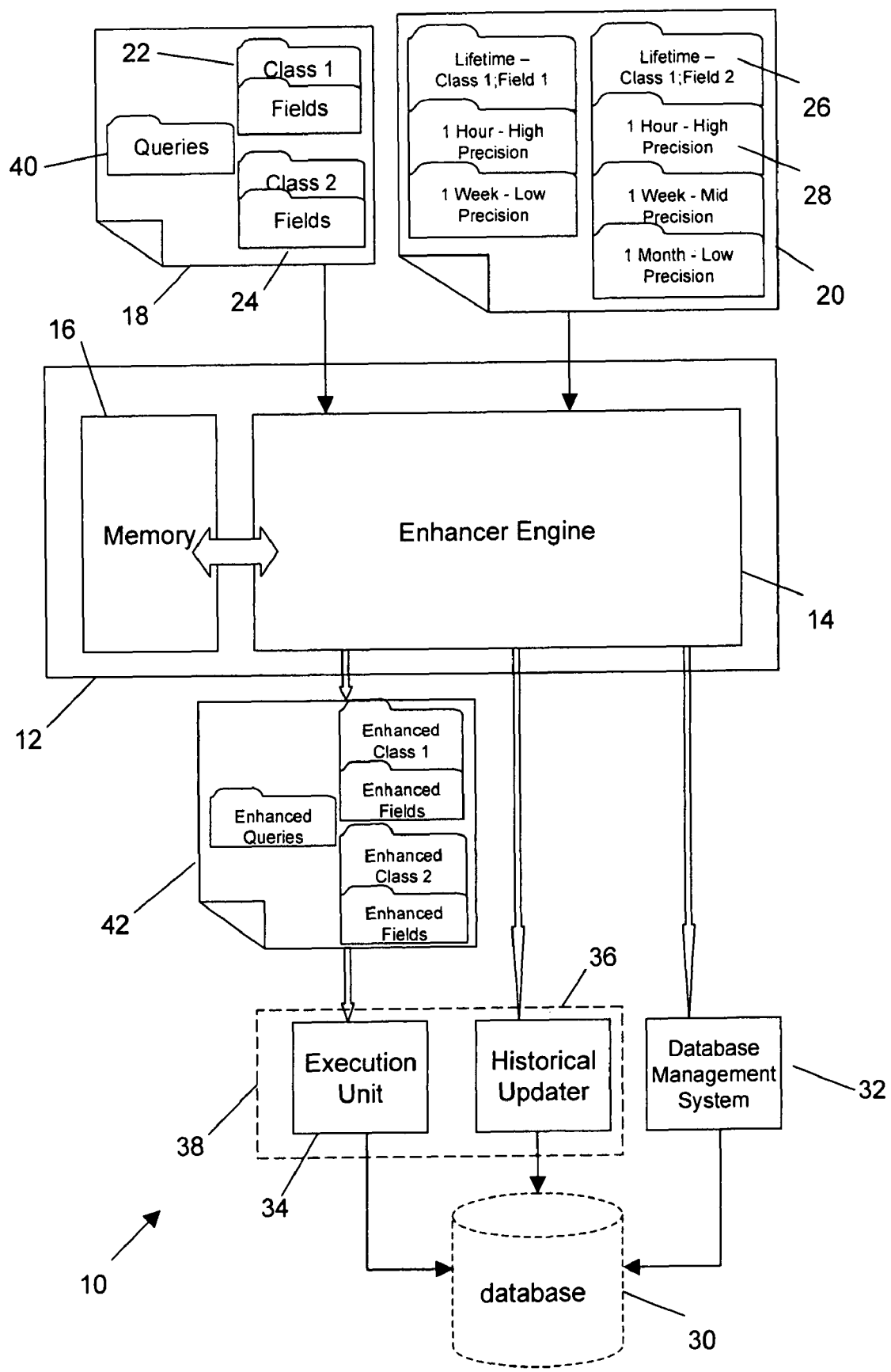

HISTORICAL DATA MANAGEMENT

The present invention relates to a method and system for the management of historical data, specifically, although not exclusively for, the management of historical state information for a telecommunications network.

BACKGROUND OF THE INVENTION

Many applications maintain data structures modelling the current state of a system, e.g. power stations, steel mills, telecoms systems. These data structures represent an abstraction of the real state of the system, where the level of abstraction is chosen to be sufficient for the intended purpose, e.g. management, fault tracking, billing. For small/simple systems it may be possible to store all this state in the memory of a computer. However, for larger systems, or where there are multiple applications, perhaps on different computers, or where a large degree of fault tolerance is required, this state needs to be stored in a database.

Writing the code to get data into and out of this database is not hard, but it is time-consuming, error-prone, can frequently obscure the more important aspects of the application logic and makes it hard to adapt rapidly to changes to our model of the system state.

A managed telecommunications network, for example a computer network, such as the Internet, typically comprises managed devices, such as: routers; switches; hubs; printers; and host computers; as well as at least one network management system (NMS). The managed devices are coupled by communications links.

For large networks, an NMS needs to store a large amount of state information in order to react to, correlate and manipulate the properties of the networks, or systems, under their control. This state information includes the current topology of the managed devices as well as the communication links between them. Each of these devices may itself have a considerable amount of state information associated with it. Some of this state information, such as the current set of Multi-Protocol Label Switching (MPLS) Label Switch Paths (LSPs), induces further levels of complex hierarchical state information. Clearly not all aspects of every device needs to be tracked by an NMS. The state information maintained by any NMS is an abstraction, or an approximation of reality, sufficient to control the system being managed. However, as NMS implementations develop, with complex correlation and closed-loop control systems increasingly being deployed, and as they become more decentralised, allowing more device state information to be monitored efficiently, the amount of data required to describe the NMS's view of the network state will grow considerably.

When a network failure of some form occurs (the exact nature of the failure being unimportant), by the time the failure has been identified, the system state may have changed from that which existed at the time of the failure. Indeed the visible symptoms will often have been caused by an underlying problem that occurred even earlier. If the system state, or at least the NMS's abstraction of this state, could be examined at any point in the past then this would help in a "root-cause analysis". The difficulty in satisfying this requirement, at least in the general case, is one of the reasons that makes root cause analysis so challenging a problem.

Various tools have been developed to help store the current state of a system. A good example is a Java Data Object (JDO). Here, a set of Java classes is defined to represent the state of the system being modelled. All the application logic then just worries about manipulating and traversing instances of these classes, without concerning itself with precisely how this data is stored in the database, retrieved from it etc. The implementer then writes a bunch of auxiliary files that describe, declaratively, how these classes should map to the database. For example, the declarative specifications in these files might state that one field should be transient, i.e. not stored in the database, another should be stored using a particular representation, another in a specific column of a specific table, and so on. A JDO enhancer takes these declarative specifications, along with the compiled version of the original code (which "knows" nothing about databases) and produces an altered version of the code that can now interact with a database. So, for example, in the original code there may be code that changes the value of a field in an instance of a class, whereas in the altered version of the (compiled) code the system will take care of ensuring this change is made persistently, in the database, by emitting the necessary Structured Query Language (SQL) statements to update the appropriate rows in the required tables. The code generated by a JDO enhancer does a lot more than this, e.g. caching instances of objects, automatically creating instances of objects in memory, from data in the database, as the user traverses links between objects, and so on. However, the important thing to note is that the user can largely ignore all this when writing the application, relying on the JDO enhancer to add in all the tedious stuff afterwards. Furthermore, because the enhancer is driven by a declarative specification of what is required, it is relatively easy to make changes, e.g. to add additional fields, change the mapping to a different database schema etc.

However, maintaining historical state is a lot harder than maintaining just the current state of the system for a variety of reasons, e.g.

We quickly run out of disk space, so we need to define how much of the past state we really need to maintain.

We now have to introduce the concept of time, i.e. we might want to traverse our abstraction of the network topology (in a network management scenario) as it existed at time t, where t is earlier than the current time. The database tables must all get a lot more complicated to support time, and queries that are time-specific also get very complex very quickly.

Manually writing code to maintain this historical state is much harder than writing the code required to simply represent the current state of the system. Furthermore, there are, at present, no tools to help in this task.

Therefore, it is an object of the present invention to provide a method and system for management of historical data, especially, although not exclusively for, management of historical state information for a telecommunications network.

BRIEF SUMMARY OF THE INVENTION

Accordingly, in one aspect there is provided a historical data management system comprising a first input for receiving a compiled application program including a definition of at least one data class having at least one field, a second input for receiving a declarative specification including a definition of at least one historical metatag associated with the at least one field and historical metadata indicating a value for the historical metatag, an enhancer coupled to the first and second inputs for receiving the compiled application program and the declarative specification, wherein the enhancer generates one or more storage representations of the at least one data class based on the at least one historical metatag and the historical metadata associated therewith, generates configuring instructions for configuring a database in accordance with the storage representation(s), generates an enhanced compiled application program including instructions for accessing data in the configured database, and generates a historical updater program based on the storage representation(s) for updating the data in the database based on the historical metadata, a database configured in accordance with the configuring instructions and having stored therein data in accordance with the storage representation(s), an execution unit for receiving the enhanced compiled application program and for executing the enhanced compiled application program to access the database so as to retrieve historical data therefrom, and a historical updater for executing historical updater program to update the data in the database based on the historical metadata, wherein the updating of the database takes place asynchronously with accessing the database.

In a second aspect, the invention provides a method of managing historical data comprising receiving a compiled application program including a definition of at least one data class having at least one field, receiving a declarative specification including a definition of at least one historical metatag associated with the at least one field and historical metadata indicating a value for the historical metatag, generating one or more storage representations of the at least one data class based on the at least one historical metatag and the historical metadata associated therewith, generating configuring instructions for configuring a database in accordance with the storage representation(s), generating an enhanced compiled application program including instructions for accessing data in the configured database, generating a historical updater program based on the storage representation(s) for updating the data in the database based on the historical metadata, configuring the database in accordance with the configuring instructions and storing therein data in accordance with the storage representation(s), executing the enhanced compiled application program to access the database so as to retrieve historical data therefrom, and executing the historical updater program to update the data in the database based on the historical metadata, wherein the updating of the database takes place asynchronously with accessing the database In one embodiment, a historical metatag comprises a relative lifetime of the associated field and the historical metadata provides one or more values for the relative lifetime required for that field to be maintained in a particular form in the database. The storage representation(s) may be determined according to the relative lifetime(s) and particular form(s) required for that field.

In another embodiment, a historical metatag comprises a precision of the associated field and the historical metadata provides one or more values of the precision required for that field over the one or more relative lifetimes of that field. The storage representation(s) may be determined according to the precision value(s) required for that field over the relative lifetime(s) of that field.

The historical updater program may alter the representation of a field in the database when the relative lifetime historical metadata associated with the field indicates that the relative lifetime of that field in a particular form has expired and the precision historical metadata indicates that a new precision value is required for that field. The historical updater program may delete a field in the database when the relative lifetime historical metadata associated with the field indicates that the relative lifetime of that field in a particular form has expired and the precision historical metadata indicates that no new precision value is required for that field according to the storage representation.

In one case, the historical updater may delete instances of a class in the database if all fields of an instance of that class are deleted.

In one embodiment, the data comprises information regarding the state of a telecommunications system. A historical state of the telecommunication system may be generated by accessing the class instances stored in the database and by reconstructing the historical state of the telecommunications system from the class instances that have not been deleted based on the storage representation(s) of the fields of each data class and the relative lifetime(s) of those fields.

BRIEF DESCRIPTION OF THE DRAWINGS

One embodiment of the invention will now be more fully described, by way of example, with reference to the drawing, which shows a schematic diagram of a historical data management system, according to a preferred embodiment of the present invention.

DETAILED DESCRIPTION OF THE DRAWINGS

The present invention provides an apparatus and method for management of historical information, specifically, although not exclusively for, the management of historical state information in a telecommunications network. The present invention, according to a first preferred embodiment, is implemented using a similar approach to that underpinning the design of Java Data Objects, but with various modifications, as described below.

Java Data Objects (JDO) [Sun Microsystems Inc. 2003] is architecture for manipulating persistent objects in the Java programming language. JDO defines interfaces and classes to be used by application programmers when using classes whose instances are to be stored in persistent storage (persistence-capable classes), and specifies the contracts between suppliers of persistence-capable classes and the runtime environment (which is part of the JDO implementation). A JDO "enhancer", or byte code enhancer, is a program which modifies the byte codes of Java class files which implement an application component, to enable transparent loading and storing of the fields of the persistent instances. Each access to a persistent field is replaced by a method call that handles the transactional and persistent behaviour for the object. The input to an enhancer consists of the Java class files to be enhanced together with an XML (Extensible Mark-up Language) file describing which classes and fields are to be made persistent, and their mapping to the underlying database schema.

To see how a simple conventional JDO system works, we can illustrate a simple example of a Java class describing products, where we define:

```
public class Product
{
    String name = null;
    String description = null;
    double price = 0.0;
    public Product(String name, String desc, double price)
    {
        this.name = name;
        this.description = desc;
        this.price = price;
    }
}
``` i.e. a product has a name, description and price. A particular kind of product is a book, so we might also define

```
public class Book extends Product
{
  String author=null;
  String isbn=null;
  String publisher=null;
  public Book(String name, String desc, double price, String author,
        String isbn, String publisher)
  {
    super(name,desc,price);
    this.author = author;
    this.isbn = isbn;
    this.publisher = publisher;
  }
}
``` i.e. the class Book inherits from Product. Now, a program that manipulates products and books can easily create new instances of these classes using the usual Java mechanism for creating objects.

However, what if it was desirable to store the product details persistently, as part of an inventory application, for example? It would be possible to write some code to store the product instances in a database, and more code to reload these instances from the database when required. However, this gets very tedious, and error prone. Furthermore, adding code to the Product and Book classes to do this quickly obscures the business logic contained in these classes. Furthermore, every time the database was changed, depending on the change, we may have to go back and alter the code for the classes.

The JDO approach allows such classes to be stored persistently, in a database, without having to (explicitly/manually) change the implementation of the classes. It does this using a bytecode enhancer. Before something is made persistent there must be a definition of how the classes should be persisted, in terms of which fields are persisted etc. This is performed by writing a Meta-Data persistence definition for each class in a JDO metadata file. There are several ways to do this; however, the most common way is to write the metadata file manually. A suitable definition for the classes might look like this:

```
<?xml version="1.0"?>
<!DOCTYPE jdo PUBLIC ...>
<jdo>
  <package name="...">
    <class name="Product" identity-type="datastore">
      <field name="name" persistence-modifier="persistent">
        <column length="100" jdbc-type="VARCHAR"/>
      </field>
      <field name="description" persistence-modifier="persistent">
        <column length="255" jdbc-type="VARCHAR"/>
      </field>
      <field name="price" persistence-modifier="persistent"/>
    </class>
    <class name="Book" identity-type="datastore"
      persistence-capable-superclass="....Product">
      <field name="isbn" persistence-modifier="persistent">
        <column length="20" jdbc-type="VARCHAR"/>
      </field>
      <field name="author" persistence-modifier="persistent">
        <column length="40" jdbc-type="VARCHAR"/>
      </field>
      <field name="publisher" persistence-modifier="persistent">
        <column length="40" jdbc-type="VARCHAR"/>
      </field>
```

-continued

```
    </class>
  </package>
</jdo>
```

Basically we are just enumerating the classes we want to make persistent, the fields in the classes that should be stored persistently (not all of them always need to be) and some optional hints about how to represent the field values in the database, e.g. the maximum expected length of a string.

A compiler for a traditional language like C will compile a program into a low-level form, such as assembler or even lower, where very little information about the higher level details of the program, such as types, remains. The output can be executed directly by the instruction set of the target machine (after assembly/linking). In contrast, a Java compiler compiles a Java program into code for a virtual machine, called the Java VM. An implementation of the Java VM then executes these bytecode sequences to run the Java application. Our Product.java and Book.java files would be compiled by a Java compiler into Product.class and Book.class files containing these bytecodes. Bytecode files contain a lot of information that allows tools to manipulate/analyse the code in various ways. In particular, some tools can actually alter the byte code after the compiler has constructed it. The JDO enhancer is an example of such a tool. It can take the compiled versions of Product and Book, and, guided by the information in the metadata file(s), modify them to include code to load and store instances of these classes in a database.

The simplest way of using JDO is to let the JDO implementation choose an appropriate schema to represent the persistent objects, i.e. it decides what database tables it needs, what columns in these tables, their types etc. The SchemaTool can analyse the metadata and construct an appropriate schema which can then be loaded into the database. In some cases the database tables already exist, e.g. they may have been created by another application. In these cases it is possible to extend the metadata file with additional mapping information that allows you to tie classes and fields to existing tables and columns within the database. Note that even in this case we still don't need to change the original source of the Product and Book classes. Furthermore, note that the same compiled Product.class and Book.class files can be targeted at different databases/schemas simply by modifying the metadata file, so Company A could sell the compiled versions of these files, keeping the source confidential, and Company B could then tailor them to a particular environment.

To make a product persistent we would write code such as:

```
Transaction tx=pm.currentTransaction( );
try
{
  tx.begin( );
  Product product =
    new Product("Sony Discman", "A standard discman from
    Sony",49.99);
  pm.makePersistent(product);
  tx.commit( );
}
```

There is no point in hiding the database details from the application if we then have to be aware of these details when querying the database for object instances. JDO therefore provides a query language that can be used to retrieve objects using a high-level, database-agnostic syntax. The queries are translated to suitable database/schema specific queries by the enhancer and/or JDO runtime. Here's a simple example:

```
Extent e = pm.getExtent(....Product.class,true);
Query q = pm.newQuery(e,"price < 150.00");
q.setOrdering("price ascending");
Collection c = (Collection)q.execute( );
Iterator iter = c.iterator( );
while (iter.hasNext( ))
{
    Product p = (Product)iter.next( );
    ... (use the retrieved objects)
}
```

The JDO implementation takes care of retrieving the data from the database, and creating the Java object instances, on demand as we traverse the collection. Furthermore, in our example, it ensures that books are created as instances of the Book class, rather than the general Product class. In more complex scenarios we may have Java class instances referring to instances of other classes. For example, we might have a class representing a warehouse, and each warehouse might contain a set of products in a "products" field. Suppose we made the warehouse class persistent and then retrieved an instance of this class from the database using a JDO query. Accessing and traversing the products field would cause the JDO implementation to instantiate all the appropriate products from the database, without the user needing to be aware of any of this work, other than having to add mapping information for this field to the Metadata file.

Suppose, now, an instance of a product is retrieved, e.g. via a JDO query, the price is changed, and then the enclosing transaction is committed. The JDO implementation will ensure the new price is written back to the database, as expected. Subsequent accesses to this object, either within this or another application, will pick up the new price. Similarly if a new instance of Book is created, made persistent, and then later queried for all books, this instance will be returned as part of the collection. But what if it is desired to know the prices of all products as they existed last Friday, or the collection of books we knew about last Saturday. As changes to the database (including additions and deletions) overwrite previous details in a JDO implementation we have no way of answering such queries (other than by manually encoding all the details to do with time, temporal queries etc, but to do this would be extremely tedious, and JDO would be a hindrance, rather than a help, in such cases as it hides the database details from the application). There has been a lot of research on how best to model time in databases, but it gets very complex very quickly, and we rapidly get to the stage where humans have difficulty manually writing the queries necessary to access such data.

Accordingly, in an embodiment of the invention, the JDO approach is extended to support history, in the sense of being able to retrieve the state of an abstract world as it existed at some time in the past. Firstly, it should be noted that there are two notions of time that have to be distinguished between. When a change is made to the data, e.g. changing the price of a product, then we can distinguish between the time the change actually occurred, i.e. the time the database was updated, and the time when this change logically occurred. In some cases these may be the same, but in other cases, e.g. where there are external events being monitored, these two times may be different. So when talking about time, querying using time, etc., it is important to remember that we may want or have to distinguish between these two different variants.

Just as JDO used a separate metadata file to indicate which classes and fields should be made persistent, in the present embodiment of the invention, an extension of this mechanism is used to indicate which of these classes/fields should be preserved historically. It should be noted that it doesn't make sense to store something historically, but not persistently. However, not everything that is stored persistently has to be stored historically. The exact format of this extension isn't particularly important, but it should be clear how a history-modifier could be added to classes and fields, similar to the persistence-modifier in the earlier metadata example. Using the same, simple approach, where the schema is generated from the metadata file, one of the existing schemes could be used for encoding the temporal aspect of the data, e.g. as described in "Developing Time-Oriented Database Applications in SQL", by Richard Snodgrass, The Morgan Kaufmann Series in Data Management Systems. The SQL queries and updates performed by a traditional JDO implementation would be replaced by their temporally-aware equivalents.

The JDO query language would need to be extended to allow time to be specified, as in

```
Extent e = pm.getExtent(....Product.class,true);
Date d = ... // Date representing last Tuesday at 11.00 AM
Query q = pm.newQuery(e,d,"price < 150.00");
```

Whilst it would be relatively easy to implement such a query, it might also be desirable to be able to deal with more sophisticated queries, such as "tell me the time when product X's price last changed, or changed to $Y".

In one embodiment of the present invention, a bytecode enhancer is used, driven by a declarative specification, to provide support to the maintenance of historical state. Of course there are a number of features that make the maintenance of historical state distinctive, so the form of the declarative specifications also needs to be rather different to a traditional JDO implementation. For example, it has already been observed that we may quickly run out of space if we attempt to keep everything indefinitely. Thus, a crude solution might be to keep everything for a fixed length of time, deleting everything older than N hours as we go along. However, it will frequently be the case that some information has more long-term value than other bits of information. Furthermore, in some cases it may be acceptable to degrade the accuracy of some of the data over time. So, for example, exact details of company expenses might be kept for a few weeks, but then, after a while, the itemized amounts might be deleted, just keeping the totals. Later still, the totals might only be kept to the nearest hundred dollars, before deleting all the records that are older than ten years. Just as an existing JDO specification file specifies what fields should be stored persistently, at least until updated, and optionally gives hints as to how best to store this data in the database, in the present embodiment of the invention, lifetime/accuracy information is specified to drive an enhancer that provides automated support for the maintenance of historical data.

In a brief overview of one embodiment of the present invention, there is shown in FIG. 1 a historical data management system 10. The system includes a "history enhanced" JDO (HJDO) enhancer 12, which includes an enhancer engine 14 and local memory 16. The enhancer 12 receives compiled application programs 18, which include the definitions of classes 22 and fields 24 making up the classes, as explained above, as well as possible queries 40. The enhancer now also receives a declarative specification 20, which includes definitions of metatags 26, such as a lifetime, associated with particular classes or fields, and metadata 28, for each metatag. In this embodiment, for example, a field may have associated with it a relative lifetime, for example, 1 hour, 1 week or 1 month. Each relative lifetime may have a different format or precision associated with it. Thus, for example, for the first hour, the data may be stored at high precision, then reduced to medium precision for a week and then reduced further to low precision for a month, after which it is no longer required to be kept.

The HJDO enhancer 12 stores the compiled application programs 18 and the declarative specifications 20 in the local memory 16 and determines representations to be used in the database for storing the data that are most appropriate given the original classes and fields and the metatags and metadata now to be associated with the classes and fields. Thus, the enhancer 12 will have to decide how to represent the state of the system. This will be guided by the same kind of information that drives a JDO enhancer, but the system will also need to choose a representation that stores time information. When a field is updated a traditional JDO implementation simply has to write the change back to the appropriate field in the database, overwriting the existing entry. However, in the present enhancer 12, the code generated would have to ensure the old version was retained, with time information indicating when the value became stale.

As previously mentioned, some fields of an object may be required to outlive others, or to degrade in precision in different ways. In a traditional JDO enhancer the analysis of the specifications determines a single representation for all instances of a class in the database. But in the present enhancer 12 case multiple such representations may be needed, different ones being chosen as the object ages. For example, initially information about ten fields in the object may be stored, but after half an hour only the five most important fields may be stored, and then just two fields one day later. Furthermore, the representation of each field may change at each transition point. So the enhancer 12 needs to decide on a sequence of storage representations for each class.

Once the particular representations for each class have been determined, the enhancer 12 generates configuring instructions for configuring a database 30 in accordance with the storage representation(s). The configuring instructions are passed to a database management system 32, which may be part of the database 30, or may be separate, for managing the database 30 to produce structures in the memory of the database to store data according to the storage representations required. The enhancer 12 also generates an enhanced compiled application program 42 including instructions for accessing data in the configured database. The enhanced compiled application program 42 is used by an execution unit 34 in the same way as a conventional application program to access data in the database, except that the enhanced application program 42 can access historical data therefrom. The enhanced compiled application program 42 thus provides, not only the same application(s) as the original compiled application program 18, but also the capability to retrieve and use historical data in the database based on the knowledge of the storage representations and the metatag attributes of that data.

Finally, the enhancer 12 also generates a historical updater program based on the storage representation(s) to clean up the database, removing fields and objects when they were too old. This historical updater program would be driven by the policy details in the specification, e.g. it could run as a separate process or thread, continually running queries against the database looking for objects that were older than the expiry criteria, as indicated by the specification. Furthermore, the historical updater program is perhaps better thought of as a process that looks for objects in the database whose current representation doesn't match the desired representation, as decided by the enhancer, driven by the HJDO specifications. In such cases the object is rewritten in the database with the desired representation, typically throwing away fields and precision in the process. The final expiration of the object, if required, is just a degenerate case of such a transformation, where all remaining fields are discarded. The historical updater program is executed by an updater 36 to update the data in the database 30 based on the historical metadata. It will be appreciated that updating of the database can take place asynchronously with user access of the database by the execution unit 34. Nevertheless, the historical updater 36 and the execution unit 34 may form part of the same computer device 38 or may be completely separate entities.

To reiterate, therefore, the steps that are carried out by the system 10 include:

1. Read in compiled application program;
2. Read in declarative specifications of the historic state behaviour desired for the classes in the program;
3. Use the declarative specifications to decide on how to represent each class in the database. Given that the specifications may require the state of each field to be preserved for a limited (or relative) lifetime, and with the representation changing over time as the precision requirements change, we will end up with a sequence of representations, with a time period associated with each representation, i.e. use representation 1 for the first N1 minutes after object creation, representation 2 for the next N2 minutes and so on. It is assumed that we are just talking about the representation of historic, rather than current state. So, if an instance of an object is created that is modelling something in the real world, as it currently exists, e.g. a router, then the enhancer would not be interested in such an object. However, when the object is updated then the old version of the object would now form part of the historic state, and it would be at this point that the historic object can be considered as being created. Of course in practice an HJDO enhancer and a traditional JDO enhancer could be combined into a single tool, helping the user to manage current and historic state in a single framework. Similarly the HJDO specification files may also contain JDO-style information that determines how to represent instances modelling the current state of the system;
4. When an object first gets created in the historic state (i.e. an object in the current state gets updated, requiring the previous state to be preserved), generate code to use the first representation in the sequence determined by step 3 for this class to write the object to the database;
5. The representations determined by step 3 will also need to be written out, either as a separate file, or as part of the enhanced application code, and used to drive the behaviour of a separate process/thread at runtime whose responsibility is to migrate objects from representation to representation as they age;
6. Identify any HJDO queries in the compiled code, and use the results from step 3 to convert the queries into appropriate SQL queries;
7. Write the updated compiled representation back out again.

The updated compiled representation will then be run in conjunction with an HJDO-specific support library.

As implied above, the enhancer also needs to be able to translate time-based queries 40, e.g. "tell me all the routers whose uptime was less than an hour in the network as it existed yesterday at midday" into the appropriate SQL query/queries. This translation clearly depends on the representation choices previously determined, i.e. depending on what absolute or relative time is specified in the query we may need to consult different tables, different columns in these tables etc. Translating queries with complex time constraints, particularly when combined with complex representations that vary extensively over time, can be complex. However, the simple case, e.g. just wanting to traverse the state as it existed at time t, where nothing expires, or just has a single representation before it does, would be relatively simple to support.

Thus, taking the example above, if an object O representing an instance at time T references another instance, and at run-time this reference is followed, then the modified JDO system of the present invention will have to retrieve the data from the database to reconstruct the instance. However, it has to do this for the state of the instance as it existed at time T. So the appropriate time to use must be determined. A simple approach would be for the enhancer to add an additional time field to each class that is to be stored historically. So O would contain T, and this field could be used when constructing the query to get the data for the referenced instance.

Just as not every field in a class needs to be made persistent in the metadata file, so not all fields need to be made historically persistent. Accessing such a field in an historic instance could be treated in the same manner as accessing a non-persistent field in a normal JDO-enhanced class, but just returning a default value. However, in many cases it may be better to raise a run-time exception.

Whereas in a conventional JDO-enhanced class there really are only two choices for a field, making it persistent or transient, in the present embodiment of the invention there is a spectrum of choices. As mentioned before, it is possible to degrade the precision with which a field is represented as it ages. Furthermore, as an extreme form of degraded precision, it would be possible to drop all details of a field after a certain age, essentially treating it as a non-historical field in such instances. Similarly all details of an object can be removed from the database once all fields have expired. To support such behaviour, such requirements need to be added to the metadata file. Thus, for example, to specify a lifetime, a lifetime attribute might be added, as in:

```
<?xml version="1.0"?>
<!DOCTYPE jdo PUBLIC ...>
<jdo>
   <package name="...">
      <class name="Product" identity-type="datastore">
         <field name="name" persistence-modifier="persistent"
                 historical-modifier="history">
            <column length="100" jdbc-type="VARCHAR"/>
         </field>
         <field name="description" persistence-modifier="persistent"
                 historical-modifier="history"
                 lifetime="24 hours">
            <column length="255" jdbc-type="VARCHAR"/>
         </field>
         <field name="price" persistence-modifier="persistent"/>
      </class>
   ...
   </package>
</jdo>
```

Here, it is specified that the description should only be kept for the first 24 hours after the object has been created. However, the comment made earlier about there being two different interpretations of time should be borne in mind. If the time meant is the time at which the object was made persistent then things are simple. On the other hand if the time is referring to some logical notion of time then some way of associating this time with the object instance is needed, e.g. by passing the time as an additional argument when the object was made persistent.

For more complex scenarios, where the precision to change over time is desired, nested elements could be used, rather than attributes, as in the following artificial example:

```
<?xml version="1.0"?>
<!DOCTYPE jdo PUBLIC ...>
<jdo>
   <package name="...">
      <class name="Product" identity-type="datastore">
         <field name="name" persistence-modifier="persistent"
                 historical-modifier="history">
            <column length="100" jdbc-type="VARCHAR"/>
         </field>
         <field name="description" persistence-modifier="persistent"
                 historical-modifier="history"
                 lifetime="24 hours">
            <column length="255" jdbc-type="VARCHAR"/>
         </field>
         <field name="price" persistence-modifier="persistent">
            <precision after="1 hour" round="0.1"/>
            <precision after="2 hours" round="1"/>
            <precision after="3 hours" round="10"/>
         </field>
      </class>
   ...
   </package>
</jdo>
```

As mentioned above, a separate process or thread is also needed that would wander over the data using the metadata information to look for fields and class instances whose current representation was inappropriate for the age of the instance, and in such cases modify the representation of the field/class in the database to the appropriate new representation, as indicated by the metadata. Although more complicated to do this for a logical notion of time, if the simplifying assumption is made that logical time is passing at the same speed as real time, it just might be offset a bit, then things remain tractable. For example, suppose an instance was logically created at 1 AM (i.e. it represents an event that happened at 1 AM) but was only made persistent at 1.30 AM. If it has a lifetime of 4 hours then it might expire either at 5 AM or 5.30 AM, depending on the behaviour that is to be implemented.

Another complication arises because the changes in representation performed by this historical updater thread/process do not occur instantaneously. For example, an instance may have a lifetime of 1 hour, but the updater may only remove the object 15 minutes later. More importantly, the metadata may indicate the precision of the data should change after one hour, and this may require changing the representation to use a different table, for example. When querying the database for instances that are 1 hour 10 minutes old it cannot necessarily be assumed that all instances will be using the new table structure appropriate for instances of that age, as the updater may not have got around to modifying all of them. Queries must therefore be conservative when retrieving such data, potentially having to query tables for multiple representations when the required time is close to representational "transition points".

In another example, for a telecommunication system containing a network, router and link, the following standard JDO specification may be defined, as known in the art:

```
<?xml version="1.0" encoding="UTF-8"?>
<jdo>
  <package name="...">
    <class name="Router">
      <field name="name"/>
      <field name="network"/>
      <field name="incoming">
        <collection element-type="Link"/>
      </field>
      <field name="outgoing">
        <collection element-type="Link"/>
      </field>
    </class>
  </package>
</jdo>
```

Therefore standard JDO can be viewed as a specific instance of the historical state information enhancer 12 where selected class instances are to be store persistently, but not historically. By this it is meant that the current version of an "instance" of the network, router or link class can be stored in the database 30, but old instances are not stored. Equivalently, standard JDO can be viewed as associating a lifetime of 0 to all old instances. So any standard JDO specification would also be a "history enhanced" JDO (HJDO) specification. The historical state information enhancer 12 would take in this HJDO specification and so would "understand" that the user wants to store instances of class Router persistently. The class may have more fields than are mentioned above, but these additional fields would not be stored in the database. So the historical state information enhancer 12 looks at the persistent fields and decides how to store them in the database 30. The main complication here involves the relationships (i.e. links) between objects, with different representations being used for one-to-many, many-to-one and many-to-many relationships. The user can specify the nature of these relationships either in a standard JDO, or a HJDO specification. Note that in standard JDO updates are destructive, for example if there is an instance of a Router class, its name is changed, and then the transaction is committed, the old name will be overwritten; therefore there is no "history".

As discussed above, accessing past state, with the same precision and detail as live state, for arbitrary times in the past, is very expensive. In order to make the problem more tractable, approximation may need to be used. For example, there may be the need to be able to omit some properties from the history. Some attributes of a router might be accessible in the current state, but not in a prior state. This raises an important issue. There is little point in saving the value of an attribute in the past state if it is never used. Only parts of an application will need to access past state and their requirements may differ from those components that work exclusively on live data. Of course, the amount of state that needs to be preserved historically is likely to change over time. There also needs to be care not to confuse the need for aggregated statistics with the need to preserve detailed attribute values. For example, suppose there is a need to construct statistics of average link utilization over various time periods, a detailed history of changes to this attribute could be kept, and then the statistical results constructed from this history when required. But this would be unnecessarily expensive unless the un-aggregated values were also required, e.g. as part of a correlation process tracking down the root cause of a network problem.

Having access to an accurate approximation of the system state five minutes or five hours ago may be very useful in root-cause analysis. But much of this value degrades quickly, with there being far less need for such detailed information for the previous day, or week. So another way in which the problem can be made more tractable is to associate "lifetime" information with attributes and classes (or entire states). "Don't keep anything older than t" would be a simplistic example of such an annotation. Also, where there may be the requirement for some attributes to degrade over time, in terms of both their value and timing accuracy, rather than just disappearing completely. For example, for data older than some time difference Δt from the current time we might just store periodic snapshots of part of the state. A request for the value of an attribute in a very old state might then just return the value in the "closest" snapshot. This might be useful behaviour for some attributes, and meaningless for others.

Thus, an HJDO specification 20 containing simple lifetime information may look like the following:

```
<?xml version="1.0" encoding="UTF-8"?>
<jdo>
  <package name="...">
    <class name="Router" lifetime="10 days">
      <field name="name"/>
      ...
    </class>
  </package>
</jdo>
```

This would introduce an explicit lifetime for old Router instances. The effect is that whenever a change is made to a Router instance, the old state of the instance is kept around for at least 10 days. If no lifetime is explicitly stated, the default would be taken to be 0 seconds (hours, days, whatever), i.e. no historical state will be saved. In addition to having to decide how to store the state of current instances of the class the historical state information enhancer engine 12 needs to decide how to store the old instances, using representations. In this example there are only two time periods of interest, "now", and old state up to 10 days old. But in general there may be many time periods of interest. In the example given, the lifetimes of the individual fields have not been constrained, so it is assumed that the historic state should be saved with the same precision as the current state. So the historical state information enhancer engine 12 may choose a database schema that stores both current and historic state within the same database table(s). Alternatively, it might choose to store the historic state in separate tables because of the need for the additional time columns in the table.

An example of adding lifetimes to individual fields is shown in the following example HJDO specification 20:

```
<?xml version="1.0" encoding="UTF-8"?>
<jdo>
  <package name="...">
    <class name="Router" lifetime="10 days">
      <field name="name"/>
      <field name="network" lifetime="5 days"/>
      ...
    </class>
  </package>
</jdo>
```

Obviously it would be an error if the maximum lifetime of a field was longer than the lifetime of the enclosing class. If the class has a lifetime, and a field doesn't have an explicit lifetime, it probably makes sense to take the lifetime of the class as the default lifetime for the field, rather than 0 which was the default for the classes themselves.

As more features are added there are more choices for how best to specify the feature, for example, it may be required that after N days compress the fields currently being stored into a single bit sequence. This makes the representation more compact, but slows down reconstructing the instance from the database representation. So the example HJDO specification 20 may look like this:

```
<?xml version="1.0" encoding="UTF-8"?>
<jdo>
  <package name="...">
    <class name="Router"
      lifetime="10 days"
      compress-after="5 days">
      <field name="name"/>
      <field name="network" lifetime="5 days"/>
      ...
    </class>
  </package>
</jdo>
```

If the exact compression scheme to use needs to be specified, or multiple compression schemes of increasing compactness over time etc, then each of these choices would require the definition the appropriate bit of "syntax" in the specification. Furthermore, each would have a knock-on effect on the schema choices, the code and queries generated by the historical enhancer 12. Similarly for other data reduction strategies such as "delete all old instances where field F only varies by <N % from the previous saved state", where the precision of how the saved instances are recorded, is degraded in order to save space.

It should be clear to someone skilled in the art that extensive syntax for the annotations could be developed, specifically using a small set of primitives combined in multiple ways.

An HJDO enhancer also provides support for querying the state, e.g. provide the set of instances representing routers whose uptime is less than 1 hour. The application programmer can write such queries at an abstract level, without worrying about the details of how this information is stored in the database. The enhancer then translates such code into low-level code to extract the required information from the database, and constructing the appropriate Java objects representing these routers.

An important aspect of the problem involves the design of a specific query mechanism for historical data. In many cases the exact choice of schema representation may be hidden from the application programmer. Indeed it may even change over time in response to changes in the demands of the application layer and attribute annotations. So hard-wiring SQL queries directly into the application may be inappropriate. Standard JDO tackles this problem by providing an application-level query mechanism. The queries are expressed in terms of the application's view of the data and a standard JDO mechanism translates such queries into the appropriate searches on the underlying database tables and run-time caches. The situation is rather more complex in the case of historical state. For example, given a reference to an attribute corresponding to a time t, an end user might want to know at what time t'<t the attribute was set to this value.

If t corresponds to some time in the past history then the end user might also wish to know at what time t">t this attribute was next updated. To answer such questions, either the database, and/or runtime caches of the data need to be consulted. But the precise nature of these queries will depend on how the historical state of this attribute has been represented in this particular application. The query problem is therefore more complicated than in the standard JDO case, partly because the queries have a temporal aspect to them, and partly because the database schemas used are a lot more complex than those required to support simple persistent classes.

With the advantage of historical state information provided by embodiments of the invention, there are a number of different questions that the application programmer should now consider when setting out queries: to what extent should time be visible when traversing historical state? given an object that is part of the state at time t, should an end user be able to query it to find out what time it corresponds to, i.e. retrieve t? As has been seen, this requirement can be expensive to support, taking up a lot of space, and preventing sharing between states. However, when an object is reached with an attribute representing state in an external database, for example legacy data, then the end user may need to know the "time" in order to construct a query for this data. So given a network instance n, at time t, should the end user be able to query at what time this instance corresponds to? should this be done for any router instance? and any link or attribute of a router? or should there be only some classes which are directly associated with their time, and for the other classes the time must be tracked via the application program, or by following pointers to other parts of the state that do know the time? So a Router instance could find the time by accessing the network and querying that. Similarly a link could find the time by accessing the source, or destination, routers, and from them the network, and so on. Chains may get long, so perhaps some classes may need to cache the time. Perhaps others just don't have access to the time at all, either because they have no need for it, it would be too expensive to store, or that it would be simple to keep track of externally. Furthermore, is the function that navigates to the time for a Router instance part of the database application program, or a method automatically generated in the Router class used to represent the historic state? or is the method in some other class, to allow the time to be queried for all objects, returning "unknown" for most objects?

Other considerations may include: given a router instance r representing some time t, should the end user be able to ask the runtime database application to find the time when an attribute of r last changed, e.g. a link was added? What if the router disappeared because of a failure. When it comes back is it the "same" router or a fresh one? i.e. when do two instances of a class representing objects at different times denote the same logical instance? and what classes in the model should such a concept be defined on? Clearly for some attributes, this is meaningless, but for classes representing physical objects such a concept of "sameness" seems essential.

A very simple example of a network topology involving routers and links might be defined as the following classes:

```
class Network {
    String      name;
    Collection  routers;
    ... // Additional attributes
}
class Router {
    String      name;
    Network     network;
    Collection incoming; // links
    Collection outgoing; // links
    ... // Additional attributes
```

```
}
class Link {
  Router from;
  Router to;
  int    bandwidth;
  ... // Additional attributes
}
```

Updating a representation of the current network state, using the Network, Router and Link classes, in response to topology change events, is a simple task, although even for this simple example there are a number of different database schemas that could be used to store this state. The problem now is to modify this example to include a historical component. There are many ways in which this could be done, and the choice will have an impact on how the resulting generated database application navigates prior state.

One approach could be to add temporal information to the database schema. But this is not as simple as it might at first seem. To start with, what "kind" of time that is required to be recorded needs to be decided. Valid time records when a fact was true in the modelled reality, whereas transaction time records when a fact was stored in the database. This distinction leads to valid time state tables and transaction time state tables. In some cases both kinds of temporal information may need to be recorded, leading to bi-temporal state tables. For the simple example the prime motivation is to construct valid time state tables, given the intended use of the historical state. However, if it is assumed, for example Open Shortest Path First (OSPF) protocol updates will be propagated quickly throughout the network, transaction time could be stored, but viewed as valid time, glossing over the distinction. There are many different ways of adding period information to relational tables. Most databases do not support periods as primitive types, so typically they have to be simulated, either by using start and end times, or a start time and a duration. Further choices arise because these times may represent "open" or "closed" periods. As a concrete example, a period might be modelled by a start and end timestamp, using a closed-open representation; the start time indicating the time at which the row first became valid, and the end time indicating the time immediately after the row was last valid. "Now" is modelled by the maximum time supported by the timestamp data-type for the database being used. So a fact that is currently valid will have a start time some time in the past, and an end time set to this maximum value.

Adding START and END columns to the database schema seems like a simple step, but there are many complex ramifications of this change. To start with, the choice of primary keys needs to be changed. For example, a NETWORK_ID column by itself would no longer be a primary key as there may now be multiple rows containing this value, differing in the periods for which they were valid. The START column could simply be added as an additional key, but the situation is more complex in the general case as time periods could potentially nest. Referential integrity also becomes a more complex issue in this setting. Examples of many of these issues can be found in the whitepaper "Developing Time-Oriented Database Applications in SQL. SNODGRASS, R. 1999, Morgan Kaufmann".

Now consider updating a table as a result of an OSPF update event. Instead of the simple UPDATE or INSERT steps that would be used to save the updated current state, an UPDATE now has to be performed to change the end time on the "current" row for this instance, followed by an INSERT to add a new "current" row. Queries over such tables, particularly when joining tables, or searching for times when particular events occurred, can quickly reach challenging proportions, especially when they have to be written by hand.

In the previous simple example, it has been assumed that the rows representing the current state of the system were stored in the same tables as the rows representing past state. Here, all that is required is a convention for what to store in the END column to indicate a current row. But in more complex scenarios, as previously discussed, multiple database schemas may be used to separate the current and past state into separate tables, particularly where only a few of an object's attributes, and therefore columns in the current row, are to be preserved in the history. Indeed even for the old entries multiple tables might be needed to hold entries of different ages. This would allow the information held for an object to be degraded gradually as it aged.

Lazily creating the state for some prior time t helps avoid excessively large memory demands, but there is another equally important side to this problem. Suppose an instance r1 is constructed to represent the router r at time t1 and another instance r2 to represent the "same" router at time t2. A router may have many attributes associated with it, and some, perhaps most, of these may not have been altered between t1 and t2. If r1 and r2 are built from the saved state in the database, independently of each other, then there is a danger that the attributes will be duplicated in memory, wasting space. Whilst, for a single router, this may not be too important, it doesn't take many routers, or states, for this to become a large problem. As mentioned earlier, there are a variety of mechanisms that could use to ensure sharing where possible, such as JDO. It may also be found that some attributes of a router, such as its name and type, are treated as constants by an application, whilst others change frequently. Factoring out the constant attributes into an auxiliary hidden class in the implementation of the historic Router class may increase the potential for space-efficient sharing, but may interact badly with the desire to treat the interface to historic and current router instances uniformly.

Another consideration is what should the runtime instances look like for any particular example database schema? Suppose they are just like the current instances, except they also have a time embedded in them. Consider a router instance with an embedded time t. Constructing the outgoing links for this object then requires selecting all link instances from the database that existed at this point in time, i.e. where START≦t<END, and building objects for these links. There is also a choice as to whether to expand the destination router, involving further queries to the database, or leaving it as a placeholder that will get expanded transparently later if required. The link instances may also need to have t embedded in them, particularly if the destination object is to be expanded lazily. This is a simple model, but it stops almost all sharing due to the presence of the time fields. It does, of course, have the advantage of allowing every object to "know" at what time in the history it represents. A more sophisticated analysis of the structure of the state graph may reveal what classes require time to be stored, and those that don't. This could be used to drive the generation of auxiliary classes to promote sharing.

Given a reference to an instance r representing some past state at time t, all the objects reachable from this instance will also be associated with this time. Furthermore, as this state is immutable, at least in principle, there is no concern about updates destroying this property. This suggests that t does not have to be "attached" to every object reachable from r. There just needs to be track kept of how an object is reached, and the time associated with the initial root of this path. There are various ways this may be achieved. Consider some application function that traverses the state corresponding to this time. Instead of each instance having the time embedded in it, the time could be passed explicitly whenever there is the need to traverse from one instance to another, for example when retrieving the outgoing links for a router. Of course explicitly having to pass around time in this way breaks one desirable property of a history mechanism, namely that past state should be traversed in the same way as current state. If there is only a need to traverse the state for a single time instant, then the use of additional parameters can be avoided by passing the time implicitly, for example using thread-local storage. But this makes it hard to manipulate multiple time periods simultaneously, a necessity for correlation purposes. This also complicates the caching process. For example, as the state is lazily expanded out, the data twice should not be fetched twice if it is traversed twice within the same transaction. Note: given the historic state is immutable, any caching mechanism doesn't have to respect transactional boundaries. Nevertheless, as mentioned a mechanism is required to purge state from working memory, and transaction boundaries are just a crude example of a suitable trigger point. If time is passed around, then the outgoing links cache will now have to be a more complex structure, indexed by time. This raises the question of whether anything is actually saved when compared to creating a separate instance for each time instant, if such caching is performed.

There will typically be far fewer variables than object instances in a running program, particularly when a complex hierarchical state is being traversed. Another approach might therefore be to associate the time with the variables, rather than with the data itself. Obviously for primitive data types this doesn't gain anything. But for more complex data it might. For example, instead of a variable holding a reference to an edge e it would now hold a reference to an object containing an edge and a time, <e, t>. This object would be an instance of a class satisfying the same interface as the Edge "class", and the methods would delegate to the supporting Edge class. For example, <e, t>.getTo( ) would return <r, t>, where r=e.getTo(t). Ideally, instances of such classes would only be bound to variables, never embedded in more complex types.

Sharing brings another set of problems. Suppose there are two instances of the same router at different times, and these share an attribute a. What if attribute a is changed in one of the instances? It would be preferable to treat saved states as immutable objects, but what enforces this, i.e. what prevents errors such as these? There are various possibilities. The sharing could be broken when an update occurs, but this would involve a lot of effort to deal with something that shouldn't occur in the first place. A better strategy could be to make updates on these instances raise an exception, or catch such errors in the type system at compile time. This suggests the need for introducing immutable variants of Router, and Link.

Deleting an object, and therefore a set of rows representing this object in the database, is treated rather differently when supporting historic state. Instead of deleting rows the END columns are merely updated to reflect the current time. These rows will then not form part of the current state. Taken to extremes, the database will just keep growing indefinitely. Therefore, as previously discussed, a scavenger process is also required to enforce the desired lifetimes for each of the objects and attributes. This process would perform such tasks as deleting rows older than T, or setting some columns to NULL for databases where this saves space, or migrating rows to other tables that have fewer columns.

To achieve acceptable performance it should be clear that the design of the database schemas and the run-time data structures necessary to maintain the history should complement each other. Furthermore, the many choices and trade-offs in the design space should be driven by an analysis of the annotations in each specific example. Given the complexities involved in efficient history representation, it would be much harder to map the enhanced "history" classes to existing schemas for maintaining historic state. However, in some simple cases this may be possible. For example, if an existing database already stores simple attribute values, or differences, keyed by time then the enhancement process would just delegate the maintenance of such attributes to the external database. A similar situation would occur where an external application, thread or class provided such information, insulating us entirely from the representation used to maintain this data. To support such a model some generic APIs (Application Programming Interfaces) may need to be defined that must be supported by the external code, although most of the example-specific linking would be specified in the annotations used by the enhancer.

Call data records are a good example of such data. Each record stores the history of an individual voice call. Traversing the state corresponding to a particular instant in time t may then require querying the call data record store. For example, given a gateway the user may wish to know which calls were being routed through this device at time t. This would involve identifying which calls were active at this time, which of these were in the appropriate state, and involved the specified gateway. Clearly this is a lot of work, even if done lazily. Depending on the kinds of analysis being performed, and their frequency, it may make sense to store such the records in a form more amenable to incremental loading of attributes and objects. The use of incremental attribute expiry, to reduce the size of the data store, is another example that may require the records to be stored using a more sophisticated structure.

More generally, when trying to reduce the amount of state saved by the runtime database application, some temporal ordering may also be unimportant. For example, suppose a change C1 is made to one object followed by another change C2 to another object soon afterwards. Recording this fine-grained ordering may be unnecessary. Perhaps just storing the changes simultaneously may be adequate, or even C2 followed by C1 if this compacts the history more. In some cases the user application may use transactions to group together such changes, and the storage system should be able to exploit this. But in other cases there may be a need to, manipulate temporal orderings without transactional hints. At a higher level, if the database application is asked for the roots at time t then in some scenarios it may be acceptable to return the state at time t', where t' is earlier or later than t, as long as there are some guarantees about the relationship between t and t'. For example, the time difference is less than some specified bound $\Delta t$, or that no event of a specified type can have occurred between t and t'.

States may be very large. The key to storing historical states is partly to just store changes wherever possible. For example, consider two states S1 and S2, corresponding to times t1 and t2. Ideally, if an attribute a of some object has not changed between t1 and t2, then there should only be one entry in our data store corresponding to this particular attribute at these times. There are many trade-offs here, and in some cases it may be better to duplicate small attributes in order to speed up the process of reconstructing the past state. But, in general, sharing is essential in the storage of history. What is perhaps sometimes overlooked is that sharing may be equally essential when manipulating such states within an application. For example, suppose we retrieve two sets of roots R1 and R2, corresponding to the states at time t1 and t2. As these roots are traversed, as well as their descendents, objects could be built in memory corresponding to each of these states. In a simple-minded approach the objects reachable from the roots in R1 may be completely disjoint from those in R2. However, this may make it difficult to manipulate many states simultaneously due to the huge memory requirements. Ideally, if an attribute or an object has not changed between t and t then it would be preferable for the memory representation to be shared between these two states wherever possible. For example, "hash-consing" techniques as disclosed in "Hash-consing garbage collection" by Appel and Gonçalves 1993, Tech. Rep. CS-TR-412-93, Princeton University, Computer Science Department, may be used to achieve this in a brute-force fashion, or drive the sharing from more detailed semantic knowledge.

Another way of reducing the amount of state kept over time would be to reduce the accuracy of attributes in the historical state. For example, consider a parameter recording link utilization. This may fluctuate very frequently, and if every tiny change had to be recorded then the history may become unacceptably large. In many cases it may be sufficient to know only the approximate value for some previous point in time. By "quantising" such parameters when constructing the history, and only recording the changes when the parameter moves into a different "band", the amount of state can be significantly reduced. The value returned for the attribute in some prior state is no longer necessarily the exact value that the attribute had, but is close to it. Earlier it was discussed that we a detailed history for an attribute may not need to be maintained if all that is required is aggregated trend data for this attribute. In some applications it may be sufficient to return an average value for an attribute over a time period. By this it is meant that retrieving the value of an attribute at time t might return the average value of this attribute over some time period $\Delta t$, that contains t. This is a rather different situation than just quantising the value domain, and the cases where this may be appropriate will be rather fewer. In the case of attributes representing monotonically increasing counters then an approach based on interpolation might also make sense.

Many attributes may change their values so frequently that it becomes unrealistic to track every change in an offline database. Suppose the Link class (with reference to the database schema of FIG. 2) had a utilization attribute that was updated either via RSVP-TE messages, or from MIB polling. Clearly its value is likely to change very frequently. Previously the quantization, or stratification of the values of such attributes has been discussed. For example, an implementation may just split the utilization into three bands, 0-20%, 21-80%, and 81-100%, and then just record changes whenever the current level crossed between bands. This reduces the rate of change in the history, but at the expense of accuracy. Another way of tackling the problem might be to just store the changes in memory, not persistently. For some attributes the loss of historic state if the machine crashes may be easy to live with, particularly if the information only has a short "use-by" date before it gets discarded anyway.

Embodiments of the present invention require that the behaviour of the attributes in past states should be described declaratively. Issues such as whether an attribute should be retrievable in the historical state, and if so with what accuracy, how frequently it is likely change, and similarly for the objects themselves, has been captured in declarative annotations. The database application code that supports historical state is driven from these annotations, thus simplifying the maintenance of such code, and therefore makes it much easier to alter the state definitions as applications evolved. For example, an attribute that was previously not needed in the historical state may now be required, because of a new form of root-cause analysis. All that is necessary is to change the declarative property of this attribute and the present invention re-generates an updated database application. JDO-style enhancement techniques are used to automatically construct the runtime classes, and database schemas, necessary to support historical state information, but it should be clear to someone skilled in the art that using this is not a necessity. Although telecommunications network management is used as a motivating example, the present invention is applicable to many other problems that require archival storage of complex hierarchical state.

It has also been suggested that in some cases the state at time t should be constructed lazily, as a side-effect of the state traversal methods. This is similar to the situation that occurs in a JDO implementation. But taken to extremes this can also be very inefficient. So how much does it make sense to prefetch? For example, in the case of a Router instance which attributes should be prefetched? Should the incoming and outgoing links be fetched, initializing the collections with only lazy references to these links, so indegree and outdegree can be queried without further fetches, or not prefetch any link details? Such choices can have a profound impact on the code inside each of the field getter methods, and even on the class hierarchy itself.

Embodiments of the present invention are able to provide a new kind of profiling, examining how the historical state actually gets used, the frequency that objects and their attributes are altered for particular classes, and then using this information to suggest the best annotations to attach to these classes.

A generic tool to help visualize state changes in classes built by the historical enhancer might be of great use during the debugging process. It would allow common debugging operations like "stop when this attribute is next changed" to be extended to "tell me the time in the history when this attribute is next changed". Of course as the history is potentially only a loose approximation to reality, the interpretation of such questions has to be treated with some care. Whilst a generic browser/debugger would be no substitute for application-specific, semantics-aware browsers, it might also form a useful starting point for the development of such browsers.

Many applications may need to perform "what-if" analysis as well, for example "What would happen if the network topology changed to . . . ?" Whilst there is usually less need to store such extrapolated state persistently, or to navigate into possible futures, some of the run-time support, treatment of attribute sharing between states and so on, may be useful in this context as well.

It has been argued that the traversal of historic state should be similar, if not identical, to the traversal of current state. This places constraints/complications on what can be done, for example time must be largely hidden. The implementation of the historic state could be simplified by allowing the historic state API to be substantially different from the current one, which undesirably, puts some of the complexity back on the user application.

Embodiments of the present invention allow, to the greatest extent possible, a uniform treatment of historic and current state, as well as past state to be traversed easily, using lazy expansion and caching to support the simultaneous manipulation of multiple past states, for example for root-cause analysis. Embodiments of the present invention also provide flexible mechanisms to abstract attributes and expire them gracefully, to prevent data volumes becoming unmanageable.

Therefore, what has been described above are embodiments of an apparatus and method that can convert declarative commands about the desired behaviour of historical state information, coupled with application code, into at least one tailored database application that can be used by an end user to store, query and display the historical state information, which specifically, but not exclusively, uses JDO-style enhancement techniques to automatically construct the tailored database application, even more specifically, but not exclusively, the historical state information displayed and stored by telecommunications network management systems.

Accordingly, at least some embodiments of the present invention provide:

The transparent maintenance of historic state information. The maintenance could be triggered automatically as a side-effect of updating the current state. Similarly the purging of old state information that is no longer required could be automated where possible.

The interfaces used to explore historic instances may be identical to those used for the current state. For example, for a given "instance" of a router, the outgoing links may be accessible in the same way irrespective of whether the router is part of some past state or the current state. The process used to compute all the routers within some number of hops of a specified router, may be applicable to all routers, no matter what their "age". The "classes" used to represent historic state may need to differ from their "current" counterparts. The mechanisms required to access attribute values may need to be substantially different, for example.

The enforcement of immutability of historic state. It is often required that some attributes of an object forming part of the current state of the system be writable. For example, given an object representing a router interface, the operational state of the real device may need to be altered by setting the value of an attribute of this object. Behind the scenes, the setter method would trigger a sequence of actions that would result in the device state being altered, e.g. via SNMP. In contrast, the data representing the state of the system at some point in the past should clearly be read-only. Similarly, it is required that the values of some of the attributes in the current state be able to change dynamically, as they respond to changes in the real device; but the corresponding data for a past state should be immutable.

The ability to retrieve the time corresponding to an object in some historic state, to allow smooth integration with legacy time-stamped data. To be able to do this for every instance would be prohibitively expensive, and frequently unnecessary, so there should be an ability to control which classes support such operations. This feature poses a possible conflict with the desire to treat, where possible, historic and current state uniformly.

The ability to navigate from an object at time t to the "corresponding" object at an earlier or later time t'. Ideally this may be done without having to manually determine the path to this object from the root(s) of the state, building a complete state for the new time t', and then navigating back down to the new object.

The ability to be able to search backwards and forwards in time looking for changes of "interest". Furthermore, this ability may be expressed relatively, e.g. "find the time and/or router state at which the set of links for the router next changed". Such an operation requires careful definition; this is because if a change to a basic root is viewed as including any change that is visible from root, and the state of the entire network is reachable from the root, then any solution would end up iterating over millions of states before finding the one of interested. So the definition of "all instances of the root" needs to be chosen with care in such an operation.

The ability to start monitoring a system at time $t_0$, and later, at a time $t_1 > t_0$, to able to access the set of roots corresponding to any time $t_i$ where $t_0 \leq t_i < t_1$. If the state of the system is taken to include the state of all the components in the system, then there is obviously a considerable amount of state information in a large network. Furthermore, some of this state information can vary very frequently, e.g. counts in an interface MIB. Periodic snapshots of the entire state may have their uses, but taking a snapshot whenever anything changes may not be an option. The individual changes could be stored separately, but this creates its own problems. There may be vast numbers of such changes, and to reconstruct the state of the system at some arbitrary point in time may then be quite time-consuming.

It will be appreciated that although only a particular embodiment of the invention has been described in detail, various modifications and improvements can be made by a person skilled in the art without departing from the scope of the present invention

What is claimed is:

1. A method, executed by a central processing unit (CPU), of managing historical data comprising:

receiving a compiled application program including a definition of at least one data class having at least one field;

receiving a declarative specification including a definition of at least one historical metatag associated with the at least one field and historical metadata indicating a value for the historical metatag;

generating one or more storage representations of the at least one data class based on the at least one historical metatag and the historical metadata associated therewith;

generating configuring instructions for configuring a database in accordance with the one or more storage representations;

generating an enhanced compiled application program including instructions for accessing data in the configured database;

generating a historical updater program based on the one or more storage representations for updating the data in the database based on the historical metadata;

configuring the database in accordance with the configuring instructions and storing therein data in accordance with the one or more storage representations;

executing the enhanced compiled application program to access the database so as to retrieve historical data therefrom; and executing the historical updater program to update the data in the database based on the historical metadata, wherein the updating of the database takes place asynchronously with accessing the database;

wherein a historical metatag comprises a relative lifetime of each field, and the historical metadata provides one or more values for the relative lifetime required for each field to be maintained in a particular form in the database.

2. A method according to claim 1, wherein the historical metadata provides a plurality of values for the relative lifetime for each field, and wherein each field is to be maintained in a different particular form in the database for each value of the relative lifetime.

3. A method according to claim 2, wherein a plurality of storage representations are determined according to the relative lifetime and particular form required for each field at different times.

4. A method according to claim 2, wherein a historical metatag comprises a precision of the associated field, and the historical metadata provides a different value of the precision for each one of the plurality of relative lifetimes of each field.

5. A method according to claim 4, wherein each storage representation is determined according to the precision value required for each field over the relative lifetime of each field.

6. A method according to claim 5, further comprising altering a representation of at least one of the fields in the database when the relative lifetime historical metadata associated with the field indicates that the relative lifetime of that field in a particular form has expired and the precision historical metadata indicates that a new precision value is required for that field.

7. A method according to claim 6, further comprising deleting at least one of the fields in the database when the relative lifetime historical metadata associated with the field indicates that the relative lifetime of that field in a particular form has expired and the precision historical metadata indicates that no new precision value is required for that field according to the appropriate representation.

8. A method according to claim 7, further comprising deleting data instances of a class in the database if all fields of an instance of that class are deleted.

9. A method according to claim 1, wherein the data comprises information regarding the state of a telecommunications system.

10. A method according to claim 9, further comprising generating a historical state of the telecommunication system by accessing the data classes stored in the database and by reconstructing the historical state of the telecommunications system from the data classes that have not been deleted based on each of the storage representations of the fields of each data class and the relative lifetimes of each of the fields of each data class.

11. A historical data management system, stored in a non-transitory computer readable medium comprising:
 a first input for receiving a compiled application program including a definition of at least one data class having at least one field;
 a second input for receiving a declarative specification including a definition of at least one historical metatag associated with each the at field and historical metadata indicating a value for the historical metatag;
 an enhancer coupled to the first and second inputs for receiving the compiled application program and the declarative specification, wherein the enhancer:
  generates one or more storage representations of the at least one data class based on the at least one historical metatag and the historical metadata associated therewith;
  generates configuring instructions for configuring a database in accordance with the one or more storage representations;
  generates an enhanced compiled application program including instructions for accessing data in the configured database; and
  generates a historical updater program based on the one or more storage representations for updating the data in the database based on the historical metadata;
 a database configured in accordance with the configuring instructions and having stored therein data in accordance with each storage representation;
 an execution unit for receiving the enhanced compiled application program and for executing the enhanced compiled application program to access the database so as to retrieve historical data therefrom; and
 a historical updater for executing historical updater program to update the data in the database based on the historical metadata, wherein the updating of the database takes place asynchronously with accessing the database;
 wherein a historical metatag comprises a relative lifetime of each field, and the historical metadata provides one or more values for the relative lifetime required for each field to be maintained in a particular form in the database.

12. A system according to claim 11, wherein the historical metadata provides a plurality of values for the relative lifetime for each field; and wherein each field is maintained in a different particular form in the database for each value of the relative lifetime.

13. A system according to claim 12, wherein a plurality of storage representations are determined according to the relative lifetime and particular form required for each field at different times.

14. A system according to claim 12, wherein a historical metatag comprises a precision for each field, and the historical metadata provides a different value of the precision for each one of the plurality of relative lifetimes of each field.

15. A system according to claim 14, wherein each storage representation is determined according to the precision value required for each field over the relative lifetime of each field.

16. A system according to claim 15, wherein the historical updater alters a representation of at least one of the fields in the database when the relative lifetime historical metadata associated with the field indicates that the relative lifetime of that field in a particular form has expired and the precision historical metadata indicates that a new precision value is required for that field.

17. A system according to claim 16, wherein the historical updater deletes at least one of the fields in the database when the relative lifetime historical metadata associated with the field indicates that the relative lifetime of that field in a particular form has expired and the precision historical metadata indicates that no new precision value is required for that field according to the storage representation.

18. A system according to claim 17, wherein the historical updater deletes data instances of a class in the database if all fields of an instance of that class are deleted.

19. A system according to claim 11, wherein the data comprises information regarding the state of a telecommunications system.

20. A system according to claim 19, wherein a historical state of the telecommunication system is generated by accessing the data classes stored in the database and by reconstructing the historical state of the telecommunications system from the data classes that have not been deleted based on each of the storage representations of the fields of each data class and the relative lifetimes of the fields of each data class.

* * * * *

UNITED STATES PATENT AND TRADEMARK OFFICE
CERTIFICATE OF CORRECTION

| | | Page 1 of 1 |
|---|---|---|
| PATENT NO. | : 8,001,539 B2 | |
| APPLICATION NO. | : 11/712065 | |
| DATED | : August 16, 2011 | |
| INVENTOR(S) | : Mitchell | |

It is certified that error appears in the above-identified patent and that said Letters Patent is hereby corrected as shown below:

Col. 25, line 51, please remove the words "the at"

Signed and Sealed this
Twenty-second Day of May, 2012

David J. Kappos
*Director of the United States Patent and Trademark Office*